United States Patent [19]

Emmons et al.

[11] 4,097,677

[45] Jun. 27, 1978

[54] UNSATURATED ESTERS OF GLYCOL MONODICYCLOPENTENYL ETHERS

[75] Inventors: William D. Emmons, Huntingdon Valley; Kayson Nyi, Sellersville, both of Pa.

[73] Assignee: Rohm and Haas Company, Philadelphia, Pa.

[21] Appl. No.: 703,348

[22] Filed: Jul. 7, 1976

[51] Int. Cl.$^2$ .............................................. C07C 69/54
[52] U.S. Cl. ............................... 560/220; 204/159.22; 260/22 CQ; 260/29.6 ME; 260/18 R; 260/31.4 R; 260/801; 260/875; 560/194
[58] Field of Search ..................................... 260/486 R

[56] References Cited

U.S. PATENT DOCUMENTS

| | | | |
|---|---|---|---|
| 2,393,609 | 1/1946 | Bruson | 260/486 R |
| 2,395,452 | 2/1946 | Brunson | 260/486 R |
| 2,838,479 | 6/1958 | Biletch | 260/486 R |
| 3,282,844 | 11/1966 | Borchert et al. | 260/486 R |
| 3,650,669 | 3/1972 | Osborn | 8/115.5 |
| 3,681,438 | 8/1972 | Starcher | 260/486 R |
| 4,001,304 | 1/1977 | Nyi et al. | 260/486 R |

OTHER PUBLICATIONS

Bruson, H. A., et al., Jour. of the Amer. Chem. Soc., vol. LXVII, (68), Jan.–Jun. 1946, pp. 8–10.

*Primary Examiner*—Paul J. Killos

[57] ABSTRACT

The invention is concerned with novel unsaturated compounds having extremely low volatility having a single monoethylenically unsaturated group of the formula $H_2C = C <$ whereby they are capable of polymerization to produce linear homopolymers and copolymers with copolymerizable monomers containing such a group, and having autoxidizable characteristics by virtue of a different type of unsaturated group. These new compounds are useful for the production of polymers, alone or in admixture with other polymers or monomers to modify the characteristics of the components of the mixture. They are useful in coating or impregnating compositions and/or in the molding, casting, or otherwise forming of shaped articles.

7 Claims, No Drawings

UNSATURATED ESTERS OF GLYCOL MONODICYCLOPENTENYL ETHERS

DESCRIPTION OF THE INVENTION

Heretofore, dicyclopentyl acrylate and/or methacrylate has been used in several types of applications, e.g., in latices as an oxidizable coalescent to lower the film-forming temperature of the polymer in the latex; as a modifier for other film-forming addition or condensation products, such as alkyds, polyurethanes, drying or semidrying oils, to harden the products obtained therefrom. See, for example, the applications for United States Patents, recently filed and identified as Ser. No. 664,597, and Ser. No. 665,017, all filed on Mar. 8, 1976. These two monomers used separately or as a mixture thereof, have been generically referred to by the designation DCP(M)A, the individual monomers being specifically designated DCPA and DCPMA respectively, in the several applications referred to.

While the DCP(M)A mentioned has been found quite useful in the several applications mentioned, nevertheless, DCP(M)A, in spite of low volatility, has an odor that is quite characteristic, pervasive, persistent, and objectionable under certain conditions when put into use by certain operative personnel. Secondly, DCP(M)A is too volatile for baking finishes wherever a faster cure may be desired or necessary for practical operation. Furthermore, use of DCP(M)A in coating, impregnating, and/or molding compositions tends to produce extremely hard and brittle products which may require plasticizers.

In accordance with the present invention, a new class of monomeric compounds, which are liquid under control ambient conditions of temperature and pressure, is provided which are of analogous character, in polymerizability and autoxidizability, to that of DCP(M)A but are characterized by such low volatility that, unlike DCP(M)A, they are for all practical purposes, virtually free of odor. Even on baking up to temperatures as high as 150° C., they do not produce an objectionably odoriferous volatile component before cure is complete. In addition, the new compounds yields a softer product than DCP(M)A so that the need for a plasticizer is greatly reduced or eliminated. For example, the new monomeric compounds offer a range of flexibility and hardness so that they can be used, if desired, with alkyd phthalicanhydride type coatings without a plasticizer.

The new and improved monomeric compounds are esters of certain unsaturated acids, preferably acrylic acid or methacrylic acid, with a glycol monodicyclopentenyl ether and may be represented by the following general formula:

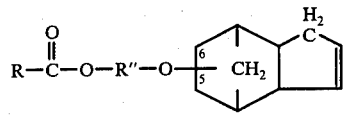  (I)

wherein R represents (1) the unsaturated hydrocarbon residue of a monocarboxylic unsaturated acid, e.g. of acrylic, methacrylic, and crotonic acid or (2) the carboxyl-containing unsaturated residue of a polycarboxylic acid, e.g. of itaconic, fumaric, maleic, or alpha-methylene glutaric acid, or the unsaturated hydrocarbon residue of such a dicarboxylic acid having both carboxyl groups replaced by an ester-ether radical of the above formula I, and R" represents the hydrocarbon residue of a ($C_2$ to $C_6$) - diol or of a ($C_2$ to $C_6$) glycol containing a heteroatom selected from O and S. The ester-ether chain may be connected to either the 5-position or 6-position of the ring nucleus as indicated in the general formula. In fact, the product may comprise a mixture of the two compounds in which part of the ester-ether chain is substituted in the 5-position and part is in the 6-position.

The preferred compounds are those in which the ester is derived from acrylic acid or methacrylic acid and the R in formula I is $H_2C = C(R^1)$ — wherein $R^1$ is H or $CH_3$. While the claims herein specifically call for the acrylate or methacrylate, nevertheless, applicants intend to cover the other unsaturated acids mentioned above under the doctrine of equivalents.

The new monomers may be prepared by first reacting dicyclopentadiene with excess diol, using an acid catalyst to produce an intermediate ether (hydroxy-R"-O-dicyclopentadiene) and then esterifying the hydroxyl of the intermediate with the unsaturated acid, e.g. acrylic acid, using an acid catalyst.

Suitable acid catalysts for producing the ether include sulfuric acid, p-toluenesulfonic acid, and boron trifluoride. Examples of ($C_2$–$C_6$) diols or glycols that may be used include ethylene glycol, propylene glycol, neopentyl glycol, 1,3-butylene glycol, 1,6-hexanediol, diethylene glycol, dipropylene glycol, thiodiethanol, etc. The monohydroxy-glycol ether obtained in the first step of the reaction may be, and preferably is, isolated by distillation from less volatile by-products such as bis-dicyclopentenyl ether and low polymers of dicyclopentadiene.

The mono-ether obtained from the first step may then be esterified with the unsaturated acid in the presence of an acid catalyst. Alternatively, the second step may be an acylation (with acid chloride or anhydride) or a transesterification of a simple ester of the acid, such as methyl methacrylate, ethyl acrylate, and so on, with the mono-ether (e.g. that obtained in the first step) in the presence of a neutral or basic catalyst.

The novel reactive monomers of the present invention are polymerizable to produce solid polymeric or resin products by either of two ways or by the simultaneous or concurrent action by both of the two ways. Thus, linear addition homopolymers and copolymers (with other monoethylenically unsaturated monomers having a single group $H_2C = C<$) are obtained by vinyl addition polymerization attributable to the unsaturation of the R group, as in the case of the unsaturated carbon to carbon bond in these R substituents, e.g. in the acrylate, methacrylate, acid monomaleate, acid monoitaconate, etc. The linear addition hompolymers are readily produced by anionic polymerization catalyst systems, leaving the point of unsaturation in the five-membered ring of formula I intact. The linear copolymers are obtained by solution polymerization using a free radical initiator or by aqueous emulsion polymerization.

The novel monomers of formula I above are also polymerizable by radiation, e.g. actinic radiation, such as ultraviolet rays, or high energy ionizing radiation, such as electron beam radiation.

A photoinitiator or sensitizer may be added to the composition before exposing it, e.g. in the form of coatings to radiation, e.g. actinic energy. A photoinitiator or sensitizer may be used in an amount of about 0.1 to about 25% by weight, and preferably from about 1 to 15% by weight, of the total polymerizable composition.

Alternatively, the monomers of formula I may be converted to solid resinous or polymeric state by autoxidation aided by use of a metal drier siccative. This action may also occur with the linear homo- and copolymers still containing the ring unsaturation. A complex solid polymeric or resinous product is obtained when reactions at both points of unsaturation occur concurrently or simultaneously. Polymers or condensation products obtained in any of the ways mentioned are useful for many purposes. The monomers of formula I themselves may be used: as radiation-curable components of coating and/or impregnating compositions; as modifiers for alkyd resins, polyurethanes, and other film-forming materials, such as thermoplastic vinyl resins, polyvinyl acetate, chlorinated rubber, and thermoplastic vinyl polymers, polyvinyl acetals, chlorinated rubber, and oxidizable drying oils; as coalescents in latices of vinyl addition polymers; as binders per se in making "polymer concrete" (PC).

Radiation-Curable Coating and/or Impregnating Compositions

The photopolymerizable compositions of this invention comprising a monomer of formula I, with or without a sensitizer or photoinitiator may be dried or cured (i.e. lightly crosslinked) by exposure to radiation. The compositions exhibit maximum sensitivity in the range of from about 1800 to 5000 A and any source of actinic light can be employed. In addition, electron beams, gamma radiation emitters and the like can be employed instead of a photoinitiator in which case there may be from 1 to 100% by weight of a formula I monomer in the composition. Suitable sources of radiation include carbon arcs, mercury-vapor arcs, fluorescent lamps with ultraviolet light emitting phosphors, argon glow lamps, photographic flood lamps, Van der Graaf accelerators, resonant transformers, betatron linear accelerators, gamma radiation emitters and combinations thereof.

Photoinitiators that may be used include selected acyloins or derivatives thereof, for example, benzoin alkyl ethers, such as benzoin methyl ether and benzoin ethyl ether, desyl halides, such as desyl bromide an desyl chloride, desyl amine, benzophenone derivatives, acetophenone compounds, polychlorinated aromatic compounds, a combination of organic carbonyls and amines or mixtures thereof. The acetophenone photoinitiators are disclosed in U.S. Pat. No. 3,715,293. The combination of organic carbonyls and amines is disclosed in U.S. Pat. No. 3,795,807, the disclosures of which patents are hereby incorporated by reference.

The photopolymerizable compositions of the present invention are useful as coatings, such as an adhesive, a marker, a vehicle for printing inks, lacquers and paints on various substrates including metals, ceramic, cement, wood, plastics, textiles, paper, floor tiles, glass, roads, parking lots, airfields and the like. The compositions are also useful in the preparation of photopolymerizable elements, i.e., a support having disposed thereon a photopolymerizable layer of a composition as described herein. Various dyestuffs, pigments, plasticizers, lubricants and other modifiers may be incorporated to obtain certain desired characteristics in the finished products.

When a photopolymerizable composition of the present invention is used as an adhesive, at least one of the laminas must be translucent when ultraviolet light is used. when the radiation source is an electron beam or gamma radiation at least one of the laminas must be capable of transmitting high energy electrons or gamma radiation respectively, and neither is necessarily translucent to light. Typical laminations include polymer-coated cellophane to polymer-coated cellophane films, treated polyethylene to treated polyethylene films, Mylar (polyester film or sheet) to a metal substrate such as copper and the like, opaque oriented polypropylene to aluminum or polymer-coated cellophane to polypropylene.

The photopolymerizable compositions of the present invention may be utilized for metal coatings such as in coil coating and in metal decorating, e.g. in formulating pigmented base coats, inks and clear overprint varnishes. Glass and plastics may also be coated and the coatings are conventionally applied by dip coating, direct and reverse roller spray. Pigmented coating systems may be used for various polyester and vinyl films; polymer-coated cellophane; glass, treated and untreated polyethylene, for example, in the form of disposable cups or bottles. Examples of metals which may be coated include sized and unsized tin plate, tin-free steel, galvanized iron, aluminum.

The compositions may be pigmented with organic or inorganic pigments, for example, molybdate orange, titanium white, chrome yellow, phthalocyanine blue and carbon black, as well as colored with dyes. Stock which may be printed includes paper, clay-coated paper and box-board.

Autoxidizable Coating and Impregnating Compositions

The new compounds may be used with any drier or siccative defined hereinbelow, they may be used in coating and/or impregnating compositions having a drier or siccative therein and also containing a volatile stabilizer, e.g. the aldehyde oximes and ketone-oximes mentioned herein below.

The ester-ether monomers of Formula I are dually reactive extremely high-boiling liquids which have been found to have an unusual combination of desirable characteristics for use in coatings: low viscosity, extremely low volatility, and low toxicity; hydrophobicity and outstanding hydrolytic stability even under acid or alkaline conditions; an outstanding compatibility with a wide range of polymeric and/or resin-forming condensates so that they can be used with or without a small amount of another solvent to form a solution of a polyester having maleate-fumarate type of unsaturation and/or drying oil unsaturation, such as an oil-modified alkyd, optionally with another polymer and/or resin-forming condensate, which can be applied as a coating to any substrate; a reactivity with an unsaturated alkyd, especially with an oil-modified alkyd, optionally in conjunction with other non-volatile polymeric and/or resinforming materials, in the presence of a metal-containing siccative or drier whereby the exposure of a coating containing the reactive monomer, the oil-modified alkyd, (optionally also another polymer and/or condensate), and a siccative, with or without other solid ingredients, e.g., pigments, fillers, plasticizers, dyes, etc. to normal atmospheric conditions results in the production of solid films having a desirable combination of characteristics. In the case of 100% solids compositions containing no solvent other than the non-volatile reactive monomer solvent, air-drying to solid state is accomplished without the necessity of volatilizing any solvent material, thereby reducing air pollution and wastage.

Alkyd Resin Coating Compositions

Any alkyd resin having unsaturation derivable from the use of (1) an ethylenically unsaturated dicarboxylic acid, such as fumaric or maleic acid, as part or all of the polycarboxylic acid component of the alkyd resin and/or (2) and unsaturated fatty acid or unsaturated oil having drying or semi-drying characteristics may be used. Examples of aromatic polycarboxylic acids that may be used in preparing the polyester or alkyd are o-phthalic acid or anhydride, terephthalic acid, isophthalic acid. Aliphatic dicarboxylic acids may be used having at least four carbon atoms and up to 36 to 40 or more carbon atoms. The dibasic acids are preferably those in which carboxylic groups are separated by unsubstituted saturated or unsaturated aliphatic hydrocarbon groups although such groups may be substituted by hydroxyl groups as in malic acid or even halogen atoms, e.g. chlorine. Examples of the aliphatic dicarboxylic acids (useful in either acid or anhydride form) that may be used in forming the unsaturated alkyds including the aforementioned oil-modified alkyds include adipic, maleic, fumaric, pimelic, suberic, azelaic, and sebacic acid. Also useful are the various commercially available grades or dimer acid obtained by polymerizing linoleic acid as described in U.S. Pat. No. 2,482,761 and J. Am. Oil Chemists Association 24, 65 (1947). The composition of one such dimer acid (sold under the designation Emery 955 dimer acid) is described in H. F. Payne, "Organic Coating Technology," Vol. I, pp. 275-7, John Wiley & Sons, Inc., N.Y., 1954, and apparently contains a small proportion of trimers having three carboxyl groups. The pertinent disclosure of these three references is incorporated herein by reference. The polyols used in making the alkyd may have two to six hydroxyl groups and from two to eight carbons and include ethylene glycol, diethylene glycol, glycerol, propylene glycol, erythritol, pentaerythritol.

Typical drying oils that may be employed as the oil-modifying component of an oil-modified alkyd are mono-, di-, and tri-glycerides of higher fatty acids having a relatively high degree of unsaturation such as linseed oil, safflower oil, tung oil, soybean oil, dehydrated castor oil, oiticica oil, menhaden oil etc. The alkyd may comprise combined therein one or more of such drying oils whether of tri-glyceride, mono-glyceride, di-glyceride type of the corresponding carboxylic acid or anhydride. Use of the term "drying" oil is intended herein to embrace those oils, whether of natural or artificial origin, that are characterized by reaction with oxygen to form cured solid products. It is intended to embrace in this term those so-called "semi-drying" oils which, because of a lesser degree of unsaturation, are not as rapid in curing in this fashion as the most typical drying oils that are on this account most commonly used in the paint and varnish industries. Thus, the oil-modified alkyds with which the invention is concerned are those in which at least a part of the oil-modification is composed of drying (or semi-drying) oil. There is no intention to spell out any limitation as to the methods by which the unsaturated alkyds including the oil-modified alkyd resin in produced since the methods of making this particular component, if used in the composition, is well-known. The alkyds employed may be long-, medium-, or short-oil products. Generally, the short-oil alkyds have about 42 to 50% oil to 45 to 39% of the diacid used in making the alkyd; the medium-oil alkyds contain 53 to 61% oil to 36 to 30% of the diacid and the long-oil alkyd contains about 64 to 70% oil to 28 to 23% diacid. Preferably, the medium-oil-modified alkyds and the long-oil-modified alkyds are employed in the compositions of the present invention. Such oil-modified resins are generally adaptable to air-drying whereas the short-oil-modified alkyds generally require baking to accomplish their curing.

The essential binder-forming components of an alkyd coating composition in accordance with the present invention are:

a. Reactive non-volatile monomer comprising at least one compound of formula I,
b. An alkyd resin having at least one unsaturated component selected from (1) maleic acid or anhydride or fumaric acid type residues or moieties and (2) drying oil type residues or moieties.

The relative proportions between the several essential components mentioned may be as follows. The amount of reactive monomer component a) may range from about 15% to about 75% of the total amount of components a) and (b). However, preferred compositions contain component (a) in an amount of about 25% to 60% by weight of (a) + (b). To this mixture of reactive monomer (a) and alkyd (b), at the time of use, there is added, if the mixture doesn't already contain a drier:

c. A siccative or mixture thereof.

Component c) is any polyvalent metal-containing complex or salt that catalyzes the oxidative curing of drying oils or drying oil-modified alkyd resin. Examples of the driers are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$ to $C_{30}$) aliphatic acids. Examples of the polyvalent metal include calcium, copper, zinc, manganese, lead, cobalt, iron, and zirconium. Examples of the aliphatic or fatty acid component or anion of the drier salt is that of napthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, volume 5, pages 195-205, published by Interscience Encyclopedia, Inc., N.Y. (1950) may be used.

The proportion of the drier may be quite low and is generally used in the amount of 0.0005 to 2% metal content by weight of (a) + (b). The drier may be added to the composition prior to storage provided such addition is made in the absence of oxygen or a volatile stabilizer d) is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of components (a) + (b). The stabilizer is generally a volatile ketone-oxime or aldehyde-oxime. Specific examples are methyl ethyl ketone-oxime, methyl butyl ketone-oxime, 5-methyl-3-heptanoneoxime, cyclohexanone-oxime, and butyraldehyde-oxime. Addition of such inhibitors is essential if long stability and pot life of the blends of components (a), (b), and (c) is desired.

The reactive non-volatile monomer component a) may consist of one monomer of formula I of a mixture of two or more of the ester-ether monomers of formula I or it may comprise a mixture of at least one monomer of formula I with one or more other non-volatile liquid reactive monomers selected from:

1. ($C_8$-$C_{20}$) alkyl or ($C_8$-$C_{20}$) alkenyl acrylates or methacrylates, (NOTE: hereinafter, the term (meth)acrylate is used as a generic term to embrace both the ester of acrylic acid and the ester of methacrylic acid.)
2. Di-($C_1$-$C_{20}$) alkyl fumarates, maleates, and itaconates, those in which the alkyl groups each have from 1 to 8 carbon atoms being preferred,
3. Vinyl esters of higher ($C_8$ to $C_{20}$) saturated or unsaturated aliphatic acids,
4. Dicyclopentenyl acrylate and methacrylate, and
5. A polyethylenically unsaturated monomer of low volatility having at least two groups of the formula $H_2C = C<$.

The reactive monomers of the five classes just mentioned, serve to modify the properties of the final cured coatings whether air-dried or baked. Thus the monomers of the first three groups listed can be used to vary the coating films in respect to flexibilty and toughness; Class 4) monomers can be used to harden the final cured films, and the fifth class can impart greater water-resistance, solventresistance, abrasion resistance, and blocking resistance. Thus, the final properties in the cured films may be varied in a predetermined way by adjusting the composition of reactive monomer a) in the alkyd coating and/or impregnating composition. In general, when a reactive monomer of formula I is blended with one or more other non-volatile reactive monomers of the five categories listed, the relative proportions between the monomer of formula I, and the other monomer of the list above may vary widely, so that the formula I monomer material may constitute from about 20% to 100% by weight of the total reactive monomer component (a). Preferably, it constitutes at least 50% to 80% by weight thereof except in the case of a mixture of formula I monomer and a monomer of class (5) in the list, the amount of the latter monomer should never exceed 25% by weight of the total of (a) and (b) binder weight, and preferably is not over 15% by weight of the total of (a) and (b).

Examples of reactive monomer in (1) of the list of other monomers are decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)-acrylate, linolenyl (meth)acrylate. Examples falling within category (2) include dimethyl fumarate, diethyl itaconate, dibutyl maleate, di(2-ethylhexyl) fumarate, di(dodecyl) maleate, and distearyl itaconate. Examples in category (3) include vinyl stearate, vinyl laurate, and vinyl oleate. Examples in category (5) include glycol or polyol (meth)-acrylates, e.g. ethylene glycol di(meth)acrylates, trimethylolpropane tri(meth)acrylate, neopentyl glycol di(meth)-acrylate; 1,6-hexanediol di(meth)acrylate, pentaerythritol tri- and tetra-(meth)acrylate; 1,3- and 1,4-butanediol di-(meth)acrylate; also allyl (meth)acrylate.

Besides the essential binder components in the alkyd coating compositions mentioned above, the composition may also comprise a volatile solvent in an amount of up to about 30% by weight, but preferably not over 20% by weight, of the entire weight of formulated coating composition ready for application, and, unless a clear coating film is desired, it may comprise a pigment and/or filler, a dispersing agent therefor, and/or other materials conventionally used in paints, varnishes and the like coating compositions.

Besides the essential components mentioned hereinabove, there may also be included various addition or condensation polymers of thermoplastic type, to the extent that they are compatible with component (a) in the presence of component b) with or without a small amount of organic solvent. Instead of thermoplastic addition polymers, thermosetting condensates, such as an aminoplast, or phenoplast, may be included again to the extent they are compatible. Generally the amounts of such additional polymers and/or condensation products may be from about ½ to 25% by weight based on the total weight of (a) + (b).

The binder of the compositions outlined above consists essentially of the components a) and b) (and any addition and/or condensation polymers just mentioned in the preceding paragraph, if included) and the vehicle consists of these components and the solvent if included. Taking these components into consideration, the preferred relative proportions between them may be as follows:

For each 100 parts by weight of the alkyd (b), the amount of monomeric component (a) may be from about 15 to 300 parts by weight, preferably about 25 to 150 parts by weight.

In preferred alkyd coating compositions, reliance may primarily be placed upon the component (a) to provide the desired viscosity for application of the coating composition (e.g., by dipping, brushing, spraying, roll-coating, and the like) so that little or no volatile solvent is used in preparation of the coating composition, thereby providing 70% to 100% solids compositions in the sense that the entire binder/vehicle of the composition is cured to produce the solid coating without the necessity to remove an appreciable amount of a volatile solvent therefrom during the curing. By avoiding volatile organic solvent materials, the hazards of fire and toxicity to operators, and the need for solvent recovery systems is avoided.

It is one part or aspect of the present invention to provide a novel and useful liquid of reactive and essentially non-volatile and non-odoriferous character that can be used as the entire vehicle of coating compositions comprising such common solid binder materials as polyesters (including alkyd and oil-modified alkyd resins), polyisocyanate prepolymers, and the like which can be cured and chemically combined with the reactive component of the vehicle when the films obtained on coating are dried at ambient temperatures or otherwise cured and/or set: This non-volatile reactive liquid consists of a monomer of formula I hereinabove or comprises a mixture of such a monomer with at least one other monomer selected from the five catergories listed hereinbefore. Such a mixture of non-volatile monomers may constitue the entire vehicle or it may be the predominant component of a vehicle which includes some volatile non-reactive solvent in minor proportion.

The non-volatile reactive mixed liquid vehicle just defined may be prepared by mixing and sold by the producer as a mixture ready for use as a formulating ingredient to serve as the entire, or an important part of the, vehicle in making coating compositions by users to whom the mixture is shipped. Besides preparing the non-volatile reactive diluent or solvent mixture in the relative proportions of 51 to 99%, preferably 60 to 90%, by weight of monomer of formula I and 49 to 1%, preferably 40 to 10%, by weight of the other non-volatile monomer component, the formula I monomer may be supplied as two or more mixtures having various proportions of formula I monomer therein including a mixture containing as low as 1% by weight thereof and 99% of the other non-volative reactive component and a mixture as high as 99% formula I monomer. The coating formulator can then mix the two liquids to provide whatever relative proportion needed for the particular coating composition he is concerned with. For example, the relative proportion of formula I monomer in the non-volatile vehicular medium he uses will depend on the hardness and toughness he seeks and the contribution thereto obtained by the other components of the composition, including especially the particular binder, e.g. alkyd as discussed herein.

Polyurethane Coating Compositions

Various coating compositions using polyisocyanate functionality to produce polyurea or polyurethane products are known. Examples of such compositions are the isocyanatemodified alkyd resins, sometimes referred to as "uralkyds" and the isocyanate-modified drying oils, commonly referred to as "urethane oils," which cure with a drier or siccative in the presence of the oxygen in air, and isocyanate-terminated prepolymers, which cure in the presence of the moisture in ordinary ambient air. Besides these important types of single-component systems, there are several important modifications of the isocyanate-terminated prepolymer, especially those in which there is included, shortly before use of the composition, a resin-forming polymer or condensate containing active hydrogen, as in amino or hydroxyl groups, and/or a catalyst (e.g., an organotin salt) to accelerate the cure, either of the moisture-curable single-component systems above or the systems in which an additional resinforming component having active hydrogen is used. The most important known polyurethane coating compositions (and their preparation) with which the present invention is concerned are described and discussed quite extensively in Chapter X. Coatings, pp. 453-607, and especially pp. 456-601 in J. H. Saunders and K. C. Frisch, Polyurethanes: Chemistry and Technology, Part II, Interscience Publishers, (N.Y., 1964).

In accordance with the present invention, it has been found that the monomeric liquids of formula I above have outstanding compatibility with organic polyisocyanates, also with prepolymers thereof with polyhydroxy or polyamine compounds, and also with reaction products of polyisocyanates on other organic compounds, such as alkyds and drying oils, e.g., the "uralkyds" and "urethane oils" above. It has also been found that these high-boiling, non-volatile liquids of formula I are useful in the isocyanate-type of coating compositions to control the viscosity with relatively little or no additional organic solvent of volatile character. Since these monomeric liquids, with a drier or siccative, are reactive and are combined in the final coating films to provide good properties therein, they provide a mechanism by which the coating composition can be adjusted in viscosity to make it suitable for application in various ways, as by spraying, brushing, etc. with or without the auxiliary use of limited amounts of volatile solvent. The reduced volatile solvent improves the environmental aspect of preparing and using the coating compositions while the combining of these monomeric materials in the film with other reactive components results in enchancement of the film properties without detriment to the qualities normally desired and attained with the polyurethane type of coating composition.

Generally, the invention contemplates coating compositions comprising (1) a polyisocyanate or isocyanatemodified drying oil, with or without (2) an organic compound having a plurality of groups containing a reactive hydrogen as defined by the Zerewitinoff method described in Kohler et al, J. Am. Chem. Soc., 40, 2181-8 (1927) or an "oxazolidine" group that is moisture-activatable to a condition wherein it is reactive with the isocyanate of component (1), and (3) a nonvolatile reactive liquid monomeric material comprising, as its major or entire constituent, at least one compound of formula I above. Component 3) may consist of formula I monomeric material or it may consist of a mixture of nonvolatile reactive liquid monomeric materials consisting of a predominant proportion therein of a formula I monomeric material and a minor proportion of at least one other nonvolatile liquid ester selected from any of the five categories listed hereinabove as a possible component of the reactive monomer a) in the alkyd coating compositions, such as an ester of a higher ($C_{10}$-$C_{20}$) aliphatic alcohol with acrylic or methacrylic acid or a di($C_1$-$C_8$)alkyl fumarate, maleate, or itaconate. Such aliphatic esters include decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)acrylate, linolenyl (meth)acrylate etc. and the dialkyl esters include dimethyl, diethyl, dibutyl, dipropyl, dipentyl, dihexyl, dioctyl, and di-(2-ethylhexyl), maleates, fumarates and itaconates. Other monomers of categories 4) and 5) in the list referred to may be present in the reactive monomer component 3). The polyethylenically unsaturated monomers when used in small amounts, such as up to 25% by weight, but preferably not over 15% by weight, based on total binder weight, improve water-resistance, solvent-resistance, abrasion-resistance, blocking-resistance, and the like. Examples include glycol or polyol (meth)acrylates, e.g. ethylene glycol di(meth) acrylates, trimethylolpropane trimethacrylate, neopentyl glycol di(meth)acrylate; 1,6-hexanediol di(meth)acrylate; pentaerythritol tri- and tetra-(meth)acrylate; 1,3- and 1,4-butanediol di(meth)acrylate; also allyl (meth)acrylate. The use of these other monomer(s) (selected from one or more of the listed categories) in conjunction with the formula I monomeric material enables the operator or user to vary widely the properties in the cured films, such as hardness, toughness, and flexibility. At the same time the use of the mixture of non-volatile monomers facilitates the adjustment of viscosity of the composition to adapt it for application by various methods, spraying, brushing, roll-coating, etc.

Thus, the reactive monomer component (3) may comprise besides the formula I monomer up to 49% by weight of the long-chain aliphatic acid (meth)acrylate.

This component of the composition may serve as the entire vehicle so that essentially no volatile solvent component is employed, thereby containing a composition that may be considered to be 100% solids in that all components serve to develop the solid resinous mass upon oxidation, condensation, and polymerization resulting from the inclusion of a drier or siccative. Whereas the most advantageous compositions from the standpoint of control of pollution, minimization of the risks of flammability and toxicity to personnel employing the compositions are those of 100% solids characteristic, nevertheless, the invention also contemplates compositions wherein an amount of volatile solvent may be employed in conjunction with the liquid monomeric component above described, the proportion of volatile solvent being not over about 40% by weight of the total weight of the formulated coating composition that is to be applied. A drier is added, preferably just before application. The compositions may also contain other catalysts, volatile solvents, pigments, fillers, stabilizers to extend pot-life.

A wide variety of polyfunctional isocyanates, that is isocyanates having at least two —NCO groups, can be used in the compositions of the invention and substantially any isocyanate having two or more —NCO groups which will react with an active hydrogen atom in an organic compound in the presence of moisture can be used. The isocyanates which are used in the compositions of the invention are well known in the art.

Among the polyisocyanates which can be used in the compositions of the invention are aliphatic isocyanates such as 1,6-hexamethylene diisocyanate, 1,8-octamethylene diisocyanate, diisocyanate, 1,12-dodecamethylene diisocyanate, 2,2,4-trimethylhexamethylene diisocyanate, and similar alkylene diisocyanates, 3,3'-diisocyanatodipropyl ether, 3-isocyanatomethyl-3,5,5-trimethylcyclohexylisocyanate, cyclopentylene-1,3-diisocyanate, cyclohexylene-1,4-diisocyanate, methyl 2,6-diisocyanatocaproate, and related isocyanates, bis(2-isocyanatoethyl)-fumarate, 4-methyl-1,3-diisocyanatocyclohexane, trans-vinylene diisocyanate and similar unsaturated isocyanates, 4,4'-methylene-bis-(isocyanatocyclohexane), and related isocyanates, menthane diisocyanate, N,N',N''-tris(6-isocyanatohexamethylene)-biuret, and related isocyanates, bis(2-isocyanatoethyl)-carbonate, and similar carbonate diisocyanates, as well as other known isocyanates derived from aliphatic polyamines, aromatic isocyanates such as tolylene diisocyanates, xylylene diisocyanates, dianisidine diisocyanate, 4,4'-diphenylmethane diisocyanate, 1-ethoxy-2,4-diisocyanatobenzene, 1-chloro-2, 4-diisocyanatobenzene, tris(4-isocyanatophenyl)methane, naphthalene diisocyanates, fluorene diisocyanates, 4,4'-biphenyl diisocyanate: phenylene diisocyanates, 3,3'-dimethyl-4,4'-biphenyl diisocyanate, p-isocyanatobenzyl isocyanate, tetrachloro-1,3-phenylene diisocyanate, and related isocyanates, 2,4,6-tribromo-1,3-phenylene diisocyanate, bis(2-isocyanatoethyl)benzene, the diisocyanate derived from "dimer acid" of various grades obtained from the polymerization of linoleic acid (see U.S. Pat. No. 2,482,761), vinyl polymers containing isocyanatoethyl methacrylate as a monomer or comonomer, prepolymers of polyisocyanates with polyhydroxyl or polyamino compounds, such as, prepolymers of 3-isocyanatomethyl-3,3,5-trimethylcyclohexylisocyanate, tolylene diisocyanate, menthane diisocyanate, 4,4'-methylene-bis(cyclohexylisocyanate), 4,4'-methylene-bis-(isocyanatocyclohexane), 2-isocyanatoethyl-6-isocyanatocaproate, and the like with polyether polyols, polyester polyols, and the like.

The preparation of the isocyanate prepolymers useful in the compositions of the invention is well known in the art. Generally the preparation of these prepolymers involves the reaction of a polyol, polyether, hydroxyl-terminated polyester, polyester amide, or other polyfunctional active hydrogen compound, with a diisocyanate or other polyisocyanate, preferably using an excess of the isocyanate to yield an isocyanate-terminated prepolymer product. An extensive description of some of the useful techniques for preparing the isocyanate prepolymers can be found in J. H. Saunders and K. C. Frish, Polyurethanes: Chemistry and Technology, Part II, Interscience Publishers (New York, 1964), especially on pages 8 to 49, and in the various references cited by Saunders and Frisch. Other preparative techniques which are known in the art can also be employed.

Other polyfunctional isocyanates which are useful in the compositions of the invention are disclosed in U.S. Pat. No. 3,162,664, of Brotherton et al., granted Dec. 22, 1964, U.S. Pat. No. 3,427,346, of Brotherton et al., granted Feb. 11, 1969, U.S. Pat. No. 3,275,679, of Brotherton et al., granted Sept. 27, 1966, U.S. Pat. No. 3,352,830, of Schmitt et al., granted Nov. 11, 1967, U.S. Pat. No. 2,729,666 of Stallman, granted Jan. 3, 1956, U.S. Pat. No. 2,768,154 of Unruh et al., granted Oct. 23, 1956, U.S. Pat. No. 3,267,122 of Lehmann et al., granted Aug. 16, 1966, U.S. Pat. No. 3,281,378, of Garber et al., granted Oct. 25, 1966, U.S. Pat. No. 3,124,605, of Wagner, granted Mar. 10, 1964, U.S. Pat. No. 2,718,516, of Bortnick, granted Sept. 20, 1955, as well as isocyanates prepared from the amines disclosed in U.S. Pat. No. 3,256,318, of Brotherton et al., granted June 14, 1966. Other isocyanates, such as those containing silicone and phosphorus can also be used in making the compositions of the invention.

An especially useful class of polyfunctional aliphatic isocyanates are the ester isocyanates represented by the formulas (a)
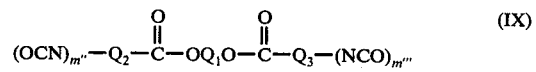
(IX)

(b)
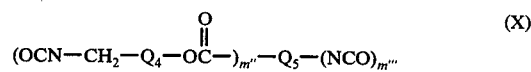
(X)

and
(c)
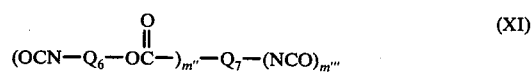
(XI)

wherein $m''$ and $m'''$ are either one or two; $Q_1$ is the diester residue of an alkane or cycloalkane diol having two primary hydroxyl groups, preferably from 2 to 18 carbon atoms, and up to one hetero oxygen or sulfur atom; $Q_2$ and $Q_3$ are divalent alkylene radicals, preferably having 1 to 18 carbon atoms; $Q_4$ is an alkylene radical, preferably having 1 to 7 carbon atoms, and up to one hetero oxygen or sulfur atom; $Q_5$ is a divalent arylene or aralkylene radical, preferably having 6 to 18 carbon atoms; $Q_6$ is an alkylene radical, preferably having 2 to 8 carbon atoms, and up to one hetero oxygen or sulfur atom; and $Q_7$ is a divalent alkylene radical, preferably having 1 to 18 carbon atoms. As used herein, the term "alkylene" also includes "cycloalkylene."

Preferably, the polyisocyanate is an isocyanate terminated prepolymer of the type described in Saunders-Frisch supra.

When component (2) is included, it can be a polyester, polyamide, or polyesteramide, terminated with groups containing a reactive hydrogen atom, such as OH, NH$_2$, NH and CONH, obtained by the condensation of I. Glycols (or other polyols) and dibasic acids
II. Amino alcohols and dibasic acids
III. Glycols, diamines and dibasic acids
IV. Glycols, amino alcohols and dibasic acids V. Amino alcohols, diamines and dibasic acids
VI. Amino acids, glycols and dibasic acids
VII. Amino acids, amino alcohols and dibasic acids
VIII. Amino alcohols, dibasic acids and hydroxycarboxylic acids
IX. Diamines and dibasic acids.

It is advantageous to use small excess of the alcoholichydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1,12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetonedicarboxylic acid.

Any amino alcohol having at least one hydrogen atom attached to the amino nitrogen atom may be employed including aromatic amino alcohols, e.g. p-hydroxymethylbenzylamine, 4 - hydroxymethyl - 4 - aminomethyldiphenyl and p-aminophenylethyl alcohols; aliphatic amino alcohols, e.g. 5 -aminopentanol - 1:6 - amino - 5 - methylhexanol - 1,4(p - aminophenyl) cyclohexanol, hydroxyethoxyethoxyethylamine, and N - (beta - aminoethyl) - N-(omega-hydroxy-hexyl)aniline.

The preferred amino alcohols are of formula

where R represents saturated divalent hydrocarbon radicals with a chain length of at least two carbon atoms. Amino alcohols which fall within this group include ethanolamine, 3 -aminopropanol, 4 - aminobutanol, 6-aminohexanol, and 10-aminodecanol.

Any diamine may be employed, which contains at least one hydrogen atom attached to each amino nitrogen atom. The preferred diamines are of formula NH$_2$RNH$_2$ where R represents saturated divalent hydrocarbon radicals with a chain length of at least two carbon atoms, e.g., ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula HO–R–COOH where R represents saturated divalent hydrocarbon radicals, e.g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

Component (2) may be a hydroxyl-terminated polyester, such as alkyd resin having a molecular weight in the range of about 4000 to 12,000 obtained from the condensation of a (a) polyol having at least 2 hydroxyl groups and from 2 to 6 carbom atoms, such as ethylene glycol, propylene glycol, trimethylene glycol, glycerol, diethylene glycol, erythritol, and pentaerythritol or mixtures thereof, with (b) a (C$_4$-C$_{12}$) aliphatic or aromatic dicarboxylic acid, such as adipic, pimelic, azelaic, sebacic, glutaric, and phthalic anhydride, or mixtures thereof, and optionally with (3) a long-chain (C$_6$-C$_{20}$) saturated or unsaturated fatty acid or an ester thereof, such as a glyceride, especially the drying or semidrying types.

Another type of material useful as component (2) is an addition polymer of one or more monomers having groups containing reactive hydrogen atoms, such as hydroxyl or amino groups. For example, polymers of hydroxyl-containing monoethylenically unsaturated monomers, such as hydroxyethyl acrylate or methacrylate, 2-hydroxypropyl (meth)acrylate, and 3-hydroxypropyl (meth)acrylate, or copolymers thereof with other monoethylenically unsaturated monomers having a terminal group H$_2$C = C<, such as styrene, vinyltoluene, vinyl acetate, acrylonitrile, acrylamide, methacrylamide, (C$_1$-C$_{18}$) alkyl esters or acrylic or methacrylic acid, e.g., methyl acrylate, methyl methacrylate, ethyl acrylate, ethyl methacrylate, butyl acrylate or methacrylate, hexyl acrylate or methacrylate, 2-ethylhexyl (meth)acrylate, lauryl (meth)acrylate, pentadecyl (meth)acrylate, and octadecyl (meth)acrylate.

Likewise, vinyl addition polymers, especially copolymers of amine-containing monoethylenically unsaturated monomers, such as aminoethyl vinyl ether, aminoethyl vinyl sulfide, 2-aminoethyl acrylate or methacrylate and the corresponding 2-(monoalkyl)aminoethyl (meth)acrylate. The copolymers may contain any one of or plurality of the monoethylenically unsaturated monomers having a terminal group, H$_2$C = C<, such as those mentioned in the preceding paragraph.

A wide variety of oxazolidines can be used as component (2) in the compositions of the invention, and any monofunctional or polyfunctional oxazolidine will generally be suitable. Generally, the oxazolidines used in the compositions of the invention will have no active hydrogen atoms. By active hydrogen atoms are meant the hydrogen atoms of groups, such as primary and secondary amino, carboxyl, and hydroxyl groups, which readily undergo reaction with electrophilic reagents, such as isocyanates. Compositions comprising oxazolidines having no active hydrogen atoms will generally have greater stability or "pot life" than compositions comprising oxazolidines which have active hydrogen atoms. However, oxazolidines which have active hydrogen atoms and compositions comprising other materials which have active hydrogen atoms can also be advantageously employed to give compositions which have adequate stability or improved curing speed over prior art materials as well as which will provide useful solid polymeric materials. In describing the compositions of the invention, the term "oxazolidine" is used to include both the five-membered ring oxazolidines and the six-membered ring tetrahydro oxazines, and to include compounds having one or more oxazolidine rings. Compounds having more than one oxazolidine ring are generally referred to herein as polyfunctional oxazolidines.

The oxazolidine substituents of the compounds useful in the compositions of the invention generally can be represented by the following formula:

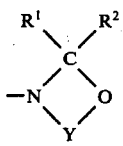 (I)

wherein
$R^1$ is a hydrogen atom, a phenyl group, a benzyl group, or a ($C_1$-$C_{12}$)alkyl group, and
$R^2$ is a hydrogen atom or a ($C_1$-$C_4$)alkyl group, or
$R^1$ and $R^2$ can be taken together with the attached carbon atom to form a saturated five-or six-membered saturated carbon ring, and
Y is the radical

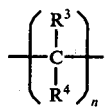

wherein
n is 2 or 3, and
$R^3$ and $R^4$ are; individually, hydrogen atoms, ($C_1$-$C_{12}$) alkyl groups, ($C_6$-$C_{10}$)aryl groups, or ($C_1$-$C_{12}$)aralkyl or alkaryl groups.

The groups represented by $R^1$, $R^2$, $R^3$, and $R^4$ can also have inert substituents, such as halogen atoms, alkoxy groups, nitro groups, and the like, and in some embodiments can also have active substituents, such as hydroxyl groups or amino groups.

Five types of oxazolidines are among the preferred oxazolidines for the compositions of the invention--polyfunctional polyol ester oxazolidines, polyfunctional polycarboxylic ester oxazolidines, monofunctional ester oxazolidines, polymers and copolymers of oxazolidinylalkyl acrylates and methacrylates, as well as the simple aliphatic and aromatic mono-and bis-oxazolidines.

Thus, there may be used:
A. The oxazolidines defined in Emmons, U.S. Pat. No. 3,743,626, Column 3, lines 1 to 23, and lines 47 to 61, including the following representatives thereof:
ethylene glycol bis-oxazolidinyl propionate
1,4-butylene glycol bis-oxazolidinyl propionate
ethylene glycol bis-isopropyloxazolidinyl propionate
butylene glycol bis-isopropyloxazolidinyl propionate
trimethylolpropane tris-isopropyloxazolidinyl propionate
lauryl oxazolidinyl propionate
stearyl oxazolidinyl propionate
methyl oxazolidinyl propionate
phenyl oxazolidinyl propionate
pentaerythritol tetra-isopropyloxazolidinyl propionate
B. The oxazolidines defined in Emmons U.S. Patent 3,743,626, Column 6, lines 7 to 38, including the following representatives thereof:
bis-oxazolidinylethyl adipate
bis-oxazolidinylethyl phthalate
bis-oxazolidinylethyl terephthalate
bis-oxazolidinylethyl isophthalate
bis-isopropyloxazolidinylethyl adipate
bis-isopropyloxazolidinylethyl phthalate
bis-isopropyloxazolidinylethyl terephthalate
bis-isopropyloxazolidinylethyl isophthalate
the bis-oxazolidinylethyl and bis-isopropyloxazolidinylethyl esters of 1,1,3-trimethyl-5-carboxy-3-(p-carboxyphenyl)indane.

C. The polymers including copolymers of the polymerizable unsaturated compounds defined in B. above, as described in Column 8, lines 11 to 26, of the Emmons U.S. Pat. No. 3,743,626.

D. The monomers and polymers of the oxazolidinylalkyl (meth)acrylate type disclosed in Hankins et al U.S. Pat. No. 3,037,006 and in Column 8, lines 50 to 74 of Emmons U.S. Pat. No. 3,743,626.

E. The oxazolidines defined in the passage of Column 8, line 75 to Column 9, line 35 of Emmons, 3,743,626, including the following representatives thereof;
1,2-bis(1,3-oxazolidin-3-yl)ethane
1,8-bis(1,3-oxazolidin-3-yl)menthane
1,8-bis(1,3-oxazolidin-3-yl)menthane
bis 4-(3-oxazolidinyl)phenyl methane
bis (1,3-oxazolidin-3-yl)methane
2-nitro-1,3-bis(1,3-oxazolidin-3-yl)propane
and related compounds disclosed in U.S. Pat. No. 3,160,634 of Hodge, granted Dec. 8, 1964,
1,1-bis(1,3-tetrahydrooxazin-3-yl)methane
bis(1,3-oxazolidin-3-yl)toluene
bis(1,3-oxazolidin-3-yl)xylene
1,6-bis(1,3-oxazolidin-3-yl)hexane
1,12-bis(1,3-oxazolidin-3-yl)dodecane
2,2,4-trimethyl-1,6-bis(1,3-oxazolidin-3-yl)hexane
3,5,5-trimethyl-1-(1,3-oxazolidin-3-yl)-3-1,3-oxazolidin-3-yl)methyl cyclohexane 1,6-bis(1,3-oxazolidin-3-yl)hexene-3. The disclosures of these oxazolidines and their preparation found in Emmons U.S. Pat. No. 3,743,626 from Column 1, line 1 through Column 9, line 64, and in Hankins et al, U.S. Pat. No. 3,037,006 are incorporated herein by reference.

The coatings obtained from the formula I monomer compositions of the present invention may be clear or colored, as desired, a pigment or filler being included to render the coating translucent or opaque.

In compositions wherein the film-forming material consists primarily of component (1), i.e. the diisocyanate, and component (3), i.e., the non-volatile reactive monomer consisting of, or comprising a formula I monomer, the proportion of reactive monomer, e.g. formula I monomeric material, may be in the range of 5% to 95%, preferably between 10 to 60% by weight of the total weight of components (1) and (3). When, however, the composition also comprises the active-hydrogen-containing component (2), the relative proportions between the several film-forming components may fall in the general ranges, or in the preferred ranges specified in Table I wherein the weight percentages are based on the total weight of film-forming components (1), (2), and (3).

TABLE I

| COMPONENT | GENERAL RANGES | PREFERRED RANGES |
|---|---|---|
| (1) | 5% to 95% | 15% to 70% |
| (2) | up to 80% | up to 70% |
| (3) | 5% to 95% | 10% to 40% |

Depending on the particular purpose for which the coatings are intended, the compositions may comprise an opacifying filler or a pigment or dye in a proportion of as low as one-fourth percent by weight to 150% or more by weight, based on the weight of binder in the composition. Examples of such coloring materials include flakes of metal, e.g. steel or aluminum, carbon black, copper oxides, red iron oxide, chrome green, molybdate chrone orange, phthalocyanines, such as copper phthalocyanine, titanium dioxide, lithopone, chrome yellow, ultramarine blue, red cadmium, yellow cadmium, organic toners and lakes, and so on.

As stated previously, the use of formula I monomeric material (with or without a minor proportion of another nonvolatile reactive monomer) enables the elimination, or substantial reduction in amount of volatile, non-reactive organic solvent used or needed in the coating compositions. The organic solvents of this type that may be used include ketones such as acetone, methyl ethyl ketone and dioxane; hydrocarbons such as xylene, toluene, benzene as well as paraffinic or naphthenic types such as solvent napthas, esters such as ethyl, butyl and amyl acetate as well as ethoxyethyl acetate, butoxyethyl acetate and the like, or esters such as butyl ethyl ether. The solvent may comprise a mixture of several types but in any case, the solvent should be of a type which does not contain an active hydrogen, as determined by the Zerewitinoff method, described in Kohler et al, J. Am. Chem. Soc., 40, 2181-8 (1927), and should be substantially anhydrous.

Besides the pigments, dyes, or fillers mentioned above, catalysts, antioxidants and antiozodants, stabilizers, flow control agents, or other optional ingredients can also be included in these compositions of the invention.

These compositions of the invention can be used in forming films, paints, lacquers, varnishes, coatings, impregnants, and adhesives for both natural and synthetic materials, such as paper, textiles, wood, plastics, metal, and leather, as binders for non-woven fabrics, and in a wide variety of other uses. To prepare coatings and films, the compositions of the invention can be applied with or without solvent by casting permanently or removably onto a suitable substrate.

Various embodiments of these compositions of the invention and the polymeric materials formed from them exhibit a number of desirable and advantageous properties. Some of the compositions, especially those having only a small content of free NCO groups, can be sealed in a single package so that if moisture is excluded, undesirable thickening or gelling is minimized during storage. Even when those compositions include a siccative, the addition of a volatile oxime in the sealed container can maintain the stability of the compositions. The oxime stabilizer may be used in a small proportion of 0.1% to 2% by weight based on the weight of component (3). It is generally a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Since exposure to atmospheric moisture will effect cure, no additional materials need be mixed with these compositions at the time of use, thus facilitating greatly their handling. Furthermore, when no solvent is incorporated in the compositions, they are extremely high solids coating materials. When some of the compositions are used for the impregnation of leather, they provide significant improvements in break over known urethane systems.

Catalysts that may be added include polyvalentmetal-containing siccatives (or driers). The drier may be any complex or salt containing a polyvalent metal that catalyzes the oxidative curing of drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature such as those of the present invention, it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$ to $C_{30}$) aliphatic acids. Examples of the polyvalent metal include calcium, copper, zinc, manganese, lead, cobalt, iron, and zirconium. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195-205, published by Interscience Encyclopedia, Inc., N.Y. (1950) may be used.

The proportion of the drier may be quite low and is generally used in the amount of 0.0005 to 2% metal content by weight of component (3).

These compositions containing the main two components (1) and (3) (without component 2)) may be prepared and stored before they are used if certain precautions are taken. Normally such storing should be accomplished in sealed containers where availability of air or oxygen is avoided. However, the two components (1) and (3) with whatever other auxiliary components are to be used in the composition (other than component (2) and the drier) may be mixed and stored until the user is ready to employ the coating composition at which time component (2) and a drier is added with or without an inhibitor or stabilizer.

The cured polyurethane products obtained in the present invention using a drier or siccative involve the incorporation of substantial amounts of oxygen in the final cured products. The drier in conjunction with the presence of oxygen, such as that of the atmosphere, is believed to cause reaction of the drying oil component of the urethane oil with the double bond in the ring of the formula I monomer and also with its other double bond to co-react the entire body of each of these reactants so that there is no significant residual formula I monomer that is not covalently bonded in the cured product. However, it is not intended to be limited to this theory of coaction. When other unsaturated moieties are involved in component (1), and/or (2) when present in the composition, the use of the drier quite effectively cures such components optionally with other components added, and does so while exposed to the atmosphere even at normal room temperature. Acceleration of the cure, of course, can be effected by heating as in a baking step (e.g., 40° C. to 150° C. or higher) in an oven. The time of baking depends upon the particular composition involved and may vary from a few seconds, depending on the thickness of film, to half an hour or more.

The compatibility of the formula I monomer manifests the desirable characteristic of providing solutions of components (1) and/or (2) and the drier as well as any number of a wide variety of other resinous or polymeric materials that may be incorporated into the coating composition. When the use of volatile solvent materials is avoided by using the formula I monomer as the sole solvent material in the composition, there is obtained in effect a 100% solids coating composition and the curing of that composition avoids the necessity of introducing into the air or into the environment any volatile organic solvent. It also reduces the necessity to provide equipment for recovering any volatilized solvent from the system or equipment in which the curing is effected.

Vinyl Resin Coating Compositions

This embodiment of the invention is concerned with certain vinyl resin coating compositions in which the vinyl resin binder or film-forming component is normally dissolved in an organic solvent which is volatilized after application of the composition to the surface of substrates to be finished. The vinyl resin component is generally of high molecular weight and it is normally difficult to obtain a reasonable viscosity in the coating composition without excessive dilution with organic solvent and the necessity to apply a plurality of coats to obtain the desired protective thickness. The present invention has been found to alleviate or reduce this difficulty in the solution coating compositions with which it is concerned, namely thermoplastic vinyl or acrylic polymer solutions, polyvinyl acetals, and chlorinated polyisoprene containing about 64-65% chlorine. In the compositions of the present invention, the vinyl resin is dissolved in an organic liquid vehicle which consists essentially of a non-volatile reactive monomer including a monomer of formula I, e.g. dicyclopentenyl oxyethyl acrylate or methacrylate or comprises a predominant proportion of such non-volatile reactive monomer.

Commercially available vinyl resin coating compositions of lacquer type, including impregnating versions thereof, based on solutions in organic solvents of thermoplastic vinyl or acrylic polymers, polyvinyl acetals, such as polyvinyl butyral, and chlorinated rubber (polyisoprene) containing 64-65% chlorine generally provide coating or impregnating films which are often of limited hardness and toughness and are seriously lacking in one or more other properties, being especially susceptible to deterioration (yellowing, discoloration, cracking, shrinking and other distortions; decomposition, removal, and the like) by wear and abrasion, chemical attack, particularly organic solvents and alkaline materials, weathering forces, such as wind, rain, and radiation including ultraviolet light rays of the sun, other natural radiation including cosmic rays, e.g., x-rays, β-rays, gamma-rays, as well as radiation emitted by all sorts of artificial means, as in lasers, x-ray machines, and radioactive materials (artificial as well as natural). Coating compositions used to make fluorescent screens in oscilloscopes, television picture tubes, and electron microscopes, are examples of compositions subject to radiation attack.

The coating compositions of the present invention comprise a monomer of formula I or a mixture thereof as the entire non-volatile reactive monomer component or as a major part thereof.

Preferred polymeric materials with which this embodiment is concerned are:

(1) Thermoplastic vinyl addition polymers of one or more monomers consisting of monoethylenically unsaturated monomers having a single unsaturated group of the formula $H_2C=C<$. These solution polymers generally have a molecular weight in the range of 20,000 to 350,000 viscosity average.

(2) Polyvinyl acetals, especially polyvinyl butyral, obtained by reacting a polyvinyl acetate under hydrolytic conditions with an aliphatic ($C_2$ to $C_8$)aldehyde, such as acetaldehyde, butyraldehyde, and so on.

(3) Chlorinated polyisoprene in which there is combined in the polymer, about 64-65% by weight of chlorine. Commonly called chlorinated rubber, it is not a rubber but is a hard, brittle polymer.

All three of these categories are soluble in organic solvents, being within the molecular weight range mentioned in (1) above, and commonly, coating compositions of lacquer type are based on the use of a volatile organic solvent, such as hydrocarbons of aromatic or aliphatic type, e.g., mineral spirits, benzene, toluene, xylene, ketones, such as acetone and methyl isobutyl ketone, ethers, such as ethyl ether and dioxane, halogenated hydrocarbons, such as chloroform, ethylene dichloride, perchloroethylene, and various mixtures of organic solvents.

It has been found that monomers of formula I have remarkable compatibility with these types of polymeric materials and can be used as the entire vehicle or as the major part thereof in making coating compositions based on such polymers if there is also provided in the coating compositions a drier or siccative and a volatile stabilizer to inhibit air-drying of the drier-containing coating composition until it has been applied to the substrate to be coated or impregnated.

The essential binder-forming components of clear and/or pigmented coating and/or impregnating compositions of this embodiment are as stated under the *Alkyd Resin Coating Compositions* heading, except that instead of using an alkyd as component (b), there is used another polymeric material, and preferably a thermoplastic vinyl addition polymer (1) above, a polyvinyl acetal (2) above, and/or a chlorinated rubber (3) all as defined hereinabove. The relative proportions between the several essential components mentioned may be as follows. The amount of reactive monomer component (a) may range from about 5% to about 70% of the total amount of components (a) and (b). However, preferred compositions contain component a) in an amount of about 10% to 60% by weight of (a) + (b). The proportion of the drier (c) may be quite low and is generally used in the amount of 0.0005 to 2% metal content by weight of (a) + (b).

The same comments made under the *Alkyd Resin Coating Compositions* heading apply to this embodiment as well in respect to the use of an oxime stabilizer, the proportion thereof, the use of a volatile organic solvent, and the proportion thereof. The reactive monomer component a) may, as stated under the *Alkyd Resin Coating Compositions* heading, contain any of the five classes of other nonvolatile monomers, in addition to the monomeric material of formula I, the relative proportions between formula I monomer and the other monomeric material may be as stated therein, and the effects obtained are generally the same. The compounds useful as siccatives, as stabilizers, and as other non-volatile reactive monomers for this embodiment are generally the same as listed under the *Alkyd Resin Coating Compositions* heading above.

Water-Based Coating Compositions

In the use of aqueous dispersions of emulsion polymers, the particles of which are water-insoluble, the effectiveness of the dispersion in forming a film after the polymer dispersion has been coated upon a surface to be painted depends upon the glass transition temperature of the dispersed polymer and the temperature at which the coating is allowed to dry. This is particularly well pointed out in the Conn et al U.S. Pat. No., 2,795,564, which discloses the applicability of many acrylic polymers in the making of waterbased paints. As pointed out in that patent, the polymer obtained in aqueous dispersion by emulsion polymerization of one or more monoethylenically unsaturated monomers (having a group $H_2C = <$) may have an apparent second order transition temperature, or glass transition temperature which depends upon the components and the proportion of such components in the polymer. The patent points out that certain of this type of monomer, such as methyl methacrylate, (styrene, vinyl acetate, vinyl chloride, and acrylonitrile being similar in this respect) tend to produce homopolymers which have relatively high glass transition values, the particular glass transition temperature referred to in that patent being designated by the symbol $T_i$ as defined in the patent. The monomers just referred to, when homopolymerized, produce hard polymers, that is, polymers having a glass transition temperature or $T_i$ value above 20° C. On the other hand, the patent mentions numerous monomers of monoethylenically unsaturated type which produce relatively soft homopolymers, this characterization representing polymers having glass transition temperatures or $T_i$ values of 20° C. or less.

The patent referred to discloses that by copolymerizing various hard and/or soft monomers in predetermined proportions, a copolymer can be obtained having a predetermined glass transition temperature or $T_i$ value in a wide range from well below $-40°$ C. up to 150° C. or higher. Coatings made from aqueous dispersions of the various polymers may be such that application of the coating compositions or aqueous-based paints made from such polymers can be effected at normal room temperature or even lower with expectation of good film-forming qualities if the $T_i$ value of the particular polymer involved is not above the ambient temperatures at which the coating is performed. For example, coatings made from aqueous-based paints containing a polymer having a $T_i$ value of abut 15° C. generally can be applied at room temperatures and result in good film formation simply by drying of the coating film in the ambient atmosphere. On the other hand, if the coating composition contains as its primary film-forming component an emulsion polymer having a $T_i$ value above room temperatures, such as from about 35° C. and up, the coated film obtained from such a paint may require elevated temperatures, such as 35° C. and up, during drying in order to assure that the polymer particles are adequately coalesced or fused into a continuous film during the drying. Some polymers may be characterized by a glass transition temperature substantially above room temperature such as up to 30°–35° C. but still would be capable of forming a continuous film at normal room temperatures because of an affinity for water (hydrophilicity) of a particular polymerized unit in the dispersed polymer particles. An example of such a monomeric component is vinyl acetate. The hydrophilicity of polymer as a result of its content in substantial amount of vinyl acetate (or equivalent monomer) aids in coalescing the polymer particles into a continuous film at temperatures lower than the $T_i$ value of such polymer as determined by a standard test.

The making of water-based paints with polymers having low $T_i$ values to enable the aqueous-based paint to be applied at normal room temperatures without the use of a plasticizer results in films which in many cases are inadequately hard and tough after drying. On the other hand, the use of polymers having high glass transition temperatures substantially above room temperature such as above 35° C. generally requires the presence of a permanent or fugitive plasticizer (the plasticized polymer having a lower $T_i$ value) or a high temperature of drying in order to provide good continuous films on the surfaces coated.

In accordance with the present invention, addition of a monomeric material of formula I to aqueous coating compositions, such as water-based paints, prepared from water-soluble addition polymers or from aqueous dispersions of water-insoluble addition polymer particles, such as those obtainable by emulsion polymerization provides a versatility to such compositions not heretofore obtained without great trouble and expense.

In accordance with the present invention, it has been found that the addition of a non-volatile reactive monomer of formula I above to coating compositions based on vinyl addition polymers of monoethylenically unsaturated monomers, particularly those having a terminal group $H_2C = C<$, is extremely valuable and useful for the purpose of favoring the ease of coating, facility of film-forming action during drying at normal room temperatures and also by rendering the coated film of greater hardness and toughness as a result of the reactive, air-curing characteristics of the monomer of formula I above. In general, a small amount of a drier or siccative, by which is meant the type of salt or complex of a polyvalent metal that is commonly employed to hasten the oxidation of drying oils, may be added to accelerate the curing of the coating film during drying. The proportion of formula I monomer in the coating composition may fall within a wide range depending upon the particular composition, its components and particularly the content of film-forming polymer therein and its apparent second order transition temperature.

When added to an emulsion polymer dispersion, the formula I monomer plays a role that is quite advantageous. It can serve as a coalescent in that it acts as a plasticizer for the dispersed polymer particles. If the dispersed polymer has a $T_i$ that is above room temperature, e.g., 35° C., so that coating compositions, such as water-base paints, made from the polymer dispersion would not form a continuous film on drying at ambient conditions, enough formula I monomer can be mixed into the polymer dispersion or coating composition containing such polymer dispersion to lower the $T_i$ and the effective film-forming temperature sufficiently to enable the coatings obtained on coating the compositions to form continuous films at ambient temperature. At the same time, on air-drying of the films the product becomes hard and block-resistant because of the autoxidizable nature of the composition.

Similarly, when the formula I monomer is added to coatings based on an aqueous dispersion of an emulsion polymer having a low $T_i$ such that time-formation at room temperature would occur without the formula I monomer, the films obtained from the formula I monomer containing polymer composition are hardened and toughened upon the aircuring of the formula I monomeric contents thereof.

The coating compositions preferably contain one or more siccatives or driers. The drier used is any polyvalent metal-containing complex or salt that catalyzes the oxidative curing of drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. Salts of organic acids as the acetylacetonate, acetate, propionate, butyrate and the like are also useful. The driers may also be complex reaction products of metal oxides, acetates, or borates and vegetable oils. Useful driers also include salts of naphthenic acids or of ($C_8$ to $C_{30}$) aliphatic acids. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195–205, published by Interscience Encyclopedia, Inc., N.Y. (1950) may be used.

The proportion of the drier may be quite low and it is generally used in the amount of 0.0005 to 2% metal content by weight of the formula I monomeric material. The drier may be added to the composition prior to storage provided such addition is made in the absence of oxygen or a volatile stabilizer is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of formula I monomer. The stabilizer is generally a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the aqueous compositions containing dispersed polymer, formula I monomer, and drier are desired.

The coating compositions may contain, of course, other materials as pointed out in the patent referred to earlier including pigments, dispersing agents, sequestering agents, defoaming agents, humectants, thickeners, bactericides, fungicides, odor-modifying agents, and other resinous materials in dispersed forms. The various pigments and other materials that are mentioned in the earlier patent may be used.

In general, the proportion of formula I monomeric material that is used in the coating composition may be from about 1% to 200% by weight, preferably 5% to 150% based on the weight of the vinyl addition polymer constituting the main film-forming component of the coating composition. It is to be understood that the acrylic polymers described in Conn et al, 2,795,564, mentioned hereinabove, are not the only types of vinyl addition polymers that can be modified and improved by the inclusion of the formula I monomer with a drier. In the copolymer systems of the patent, the hardening component is a lower methacrylate, such as methyl methacrylate, but similar copolymer systems in which the hard lower methacrylate is partly or completely replaced by such hardening monomers as styrene, vinyltoluene, acrylonitrile, methacrylonitrile, vinyl chloride, vinylidene chloride, or vinyl acetate are also improved by the inclusion of formula I monomer and a drier. It has been found that the formula I monomer is also useful in conjunction with aqueous coating systems based on natural latices or synthetic latices produced from butadiene, chloroprene, styrene/butadiene copolymers, acrylonitrile-butadiene-styrene copolymers and related synthetic rubber systems which have low $T_i$ values. Films obtained from these dispersions are also improved in respect to hardness by the incorporation of a formula I monomer with a drier.

The use of a reactive monomer of formula I makes it possible to obtain hard, tough coating films from coating compositions which comprise a polymer having a low $T_i$ (which would normally form a soft film). The benefits can be obtained without the use of a plasticizer or with a greatly reduced amount of permanent plasticizer in the compositions.

The incorporation of formula I monomer in coating compositions is not restricted to those in which the film-forming component comprises or consists essentially of water-insoluble dispersed particles of a polymer or copolymer. It is also useful in conjunction with aqueous solutions of vinyl addition polymers wherein the solubility of the polymer is essentially true solubility by virtue of low molecular weight of the polymer containing hydrophilic groups as well as those characterized by the formation of colloidal solutions.

The soluble polymers may derive their solubility from a large content of hydrophilic groups such as acid mers which can be in acid or in salt form. Examples of such acids include acrylic acid, methacrylic acid, crotonic acid, itaconic acid, maleic acid, citraconic acid, aconitic acid, and the like. The salts may be those of ammonia, amines, such as dimethylaminoethanol, triethylamine, 2-amino-2-methyl-1-propanol, and the like, or an alkali metal, especially sodium, potassium, or lithium. Besides polymers containing large proportions of acid units such as polyacrylic acid, polymethacrylic acid, or copolymers such as copolymers of 15% methacrylic acid and 85% butyl methacrylate, there may be used copolymers containing a large proportion of acrylamide or methacrylamide units or polymers containing a large proportion of amine units such as homopolymers of oxazolidinylethyl acrylate or copolymers of the latter amine-containing polymer with up to 20% by weight of methyl acrylate. Water-solubility may also be derived from polymerized mers containing hydroxyl groups, such as hydroxyethyl acrylate or methacrylate, 2-hydroxypropyl acrylate, 3-hydroxypropyl acrylate. Water-solubility can also be the result of copolymerization of two or more types of the hydrophilizing monomers mentioned herein. The use of a formula I monomer with a drier in these instances serves to modify the character of the final coating film.

The use of the formula I monomer in the coating compositions serves several functions or purposes. In aqueous solutions of water-soluble polymers, it aids the adjustment of viscosity of facilitate coating without the necessity to dilute the solution excessively with water or other water-miscible volatile solvent. The formula I monomer then becomes part of the binder component on air-drying and contributes to the solvent-resistance, water-resistance, alkali-resistance, gloss, hardness, and toughness of the cured coating films. In coating compositions based on aqueous dispersions of water-insoluble polymer particles, e.g., obtainable by emulsion polymerization, the formula I monomer serves as a coalescent, hardener, toughener, viscositycontrolling aid, and so on. In all cases, the formula I monomer on air-dry curing of the coating compositions containing the vinyl polymer, formula I monomer, and drier, becomes part of the binder in the final cured coating films. Avoidance of volatile organic solvents also reduces pollution.

The non-volatile, reactive component may, and preferably does, consist essentially of formula I monomeric material but, if desired, it may comprise a mixture of at least a major proportion (e.g. 51% to 99% by weight) thereof and a minor proportion of other non-volatile reactive ethylenically unsaturated monomeric material selected from (1) a higher ($C_{10}$-$C_{20}$)aliphatic ester of acrylic or methacrylic acid, e.g. ($C_{10}$-$C_{20}$)alkyl and ($C_{10}$-$C_{20}$)alkenyl acrylates and methacrylates, and (2) a vinyl ester of a higher ($C_{10}$-$C_{20}$) aliphatic acid, or a minor proportion of non-volatile, reactive dialkyl ($C_1$-$C_8$) maleates, fumarates, and itaconates. Optionally, to improve water-, solvent-, abrasion-, and blocking-resistance, the non-volatile reactive formula I monomer - containing material may also comprise a small amount up to 25%, preferably 2 to 15%, by weight, based on binder weight, of a polyethylenically unsaturated material, such as glycol or polyol (meth)acrylates, e.g. ethylene glycol di(meth)acrylate, 1,4-butanediol di(meth)acrylate, 1,6-hexane diol di(meth)acrylate, 1,3-butylene glycol dimethacrylate, neopentyl glycol di(meth)acrylate, pentaerythritol tri- and tetra-(meth)acrylate, trimethylolpropane trimethacrylate; also allyl(meth)acrylates. Examples of the esters (1) are decyl acrylate, isodecyl acrylate, undecyl acrylate, lauryl acrylate, cetyl acrylate, pentadecyl acrylate, hexadecyl acrylate, octadecyl acrylate, the corresponding methacrylates, and the unsaturated analogs, such as oleyl acrylate or methacrylate, linoleyl (meth)acrylate, linolenyl (meth)acrylate, and so on. Examples of (2) are vinyl decanoate, vinyl laurate, vinyl oleate, vinyl palmitate, vinyl myristate, and vinyl stearate. Examples of the diesters include dimethyl maleate, fumarate, and itaconate, diethyl maleate, fumarate and itaconate, and dibutyl maleate, fumarate, and itaconate.

Polymer Concrete (PC)

The non-volatile reactive monomers of formula I are also useful as the binders for inorganic powdered or granular material to form a "polymer concrete" i.e. a "PC." Among the materials that can be bound by the autoxidizable curing of a composition comprising a monomer of formula I are sand, gravel, stone chips, e.g. marble chips, and even hydraulic cement. The amount of monomer of formula I used in the composition to be hardened may be from 2% to 40% by weight, based on the total weight of granular aggregate material to be molded. Before casting or molding the composition, a siccative is mixed into the composition, in a proportion in the range of 0.0005 weight percent up to 2 weight percent, based on the weight of monomer of formula I.

To vary the hardness and flexibility of the cured product, the monomer of formula I may be mixed with one or more other non-volatile reactive monomers of the five classes mentioned under the *Alkyd Resin Coating Compositions* heading above. The amount of the other monomeric material may be from 0.5 to 60%, preferably not over 40%, by weight of the formula I monomer weight.

In the following examples, illustrative of the invention, that is, the new compounds and their uses, the parts and percentages are by weight and the temperatures are in Centigrade unless otherwise specified.

EXAMPLE 1

(a) Methacrylate Ester of Ethylene Glycol Monodicyclopentenyl Ether

A three-liter, three-necked, round-bottomed flask equipped with a mechanical stirrer, a thermometer, a condenser atop a Dean Stark trap, an air ebullator, and a heating mantle is charged with 971.5 g (5 moles) of ethylene glycol monodicyclopentenyl ether, 473.5 g (5.5 moles) of methacrylic acid, 19.0 g of p-toluenesulfonic acid catalyst, 0.75 g of hydroquinone inhibitor, and 1000 g of heptane solvent. The mixture is heated at reflux; after 4 hrs., 67 g. (74.4%) of water is removed. During the next 6 hrs., reflux is continued while 400 ml of heptane is removed to increase the batch temperature to 115° C; conversion is 97.8% as measured by water evolution.

The crude product is neutralized with 437 g (0.825 mole) of 20% aqueous sodium carbonate, diluted with 150 ml of water, and the lower aqueous phase separated. The product phase is washed with 3 × 150 ml of water until the washes are neutral. Hexane is removed in vacuo to afford a quantitative yield of methacrylate ester. Glc analysis shows the product to contain ca. 3-4% unreacted alcohol. A small portion of the product is purified by vacuum distillation (b.p. 115°–120° C/0.1mm Hg) in the presence of phenothiazine inhibitor.

Analysis: % Calculated: C, 73.25; H, 8.45; O, 18.29.
% Found: C, 73.48; H, 8.88; O, 18.12.

IR spectral analysis and NMR investigation confirms the product identity.

(b) The ethylene glycol monodicyclopentenyl ether that can be used as the starting material in the esterification described in part (a) of Example 1 can be the product obtainable as follows:

A two-liter, three-necked, round-bottomed flask equipped with a mechanical stirrer, a thermometer and a thermostatic control, an addition funnel, and a heating mantle atop a pot-lifter is charged with 993.1 g (16 moles) of anhydrous ethylene glycol and 28.4 g (0.2 mole, 5 mole % on dicyclopentadiene) of boron trifluoride etherate. The solution is heated to 110° C and dicylopentadiene (528.8 g., 4 moles) is added over 5 hr. during which the temperature is maintained at 110°–120° C. At the end of the addition, the dark product mixture is held at 115° C for another 3 hr. Glc analysis shows complete consumption of dicyclopentadiene.

The reaction mixture is cooled to room temperature and 28 ml (0.336 mole) of concentrated, aqueous ammonia is added gradually, followed by 150 ml of water. The product is taken up with 750 ml of hexane and transferred to a separatory funnel. The lower layer containing the ammonia complex of $BF_3$ and unreacted ethylene glycol is drained. The product is washed with 3 × 150 ml of water to achieve neutrality in the aqueous phase. Hexane is stripped in vacuo affording 696 g of crude product; distillation at reduced pressure (b.p. 92°–93° C/0.05 mm Hg) through a short Vigreux column yields 530 g (68%) of clear, light yellow liquid which is ca. 99% pure by glc analysis.

EXAMPLE 2

Acrylate Ester of Ethylene Glycol Monodicyclopentenyl Ether

The acrylate ester is prepared in the same manner as its methacrylate analog, using 396 g (5.5 moles) of acrylic acid instead of 5.5 moles of methacrylic acid. Identity is confirmed by Nmr, Ir, and elemental analysis.

EXAMPLE 3

Methacrylate Ester of Neopentyl Glycol Monodicyclopentenyl Ether (a) Neopentyl glycol monodicyclopentenyl ether is prepared in the same manner as the ethylene glycol analog used in Example 1 above. The ethylene glycol is replaced by 2659 g (16 moles) of neopentyl glycol. The product is isolated by distillation (112°–115° C/0.2 mm Hg) in 70% yield. Nmr is used to confirm the constitution of the compound.

(b) The methacrylate ester is prepared by esterification with methacrylic acid in the manner described in Example 1. A portion of the product is distilled (b.p. 140° C/0.4 mm Hg).

Analysis: % Calculated: C, 74.96; H, 9.27; O, 15.77.
% Found: C, 74.96; H, 9.27; O, 15.77.
Nmr and IR spectra confirm the identity.

EXAMPLE 4

Acrylate Ester of Neopentyl Glycol Monodicyclopentenyl Ether

The acrylate ester is prepared (b.p. 140° C/0.4 mm Hg) in the same manner as its methacrylate analog in Example 3, except that the methacrylic acid is replaced by a corresponding molar amount of acrylic acid. The spectra are consistent with the structure and differ from the methacrylate only in the acrylic vs methacrylic absorptions.

Analysis: % Calculated: C, 74.45; H, 9.02; O, 16.53
% Found: C, 74.68; H, 9.15; O, 16.53

EXAMPLE 5

Methacrylate of 1,2-Propylene Glycol Monodicyclopentenyl Ether (a) The procedure of part (b) of Example 1 is repeated using 1217.4 g (16 moles) of 1,2-propylene glycol instead of the corresponding molar amount of ethylene glycol, yielding the 1,2-propylene glycol monodicyclopentenyl ether.

(b) The procedure of part (a) of Example 1 is repeated using 1041.5 g (5 moles) of 1,2-propylene glycol monodicyclopentenyl ether instead of 5 moles of the homologous ethylene glycol monodicyclopentenyl ether. Confirmation of the compound's constitution is obtained by elemental analysis, Nmr, and IR spectral analysis.

EXAMPLE 6

Methacrylate of 1,3-Butylene Glycol Monodicyclopentenyl Ether (a) The procedure of part (a) of Example 5 is repeated replacing the 1,2-propylene glycol with 1441.7 g (16 moles) of 1,3-butylene glycol.

(b) The process of part (b) of Example 5 is repeated, replacing the monoether used therein with 1203.5 g (5 moles) of the 1,3-butylene glycol monodicyclopentenyl ether obtained by the process of part (a) hereof.

EXAMPLE 7

Dicyclopentenyloxyethyl methacrylate (Ex. 1a) is tested as a latex coalescent versus a typical fugitive coalescent 2,2,4-trimethyl-1,3-pentanediol monoisobutyrate (available under the trademark Texanol[1]) with a hard ethyl acrylate/methyl methacrylate copolymer latex 47% solids (Tg~42° C). Monomer 1a (40% on latex solids) is gradually added to the latex with stirring. Cobalt (II) acetylacetonate (0.2% metal on latex solids plus monomer) and methyl ethyl ketone-oxime (0.26% on latex solids plus monomer) stabilizer are added and the mixture is stirred overnight to ensure complete solubilization of the metal drier. Films are cast and Table A shows hardness development as a function of time.

[1]Trademark, Eastman

TABLE A

|  | Room Temperature Knoop Hardness Number (KHN) Development | | | |
|---|---|---|---|---|
|  | 64 hr. | 72 hr. | 88 hr. | 9 days |
| Latex containing 20% Texanol | 0.3 | 0.4 | 0.4 | 0.4 |
| Latex containing 40% 1a | 4.5 | 4.1 | 5.1 | 6.0 |

With the fugitive coalescent, this latex film requires several months at ambient temperature to develop full hardness (KHN = 4-5). In contrast, with the autoxidatively curable coalescent 1a, hardness development is much more rapid and the ultimate hardness of the latex is increased (KHN = 6-7). Further, monomer 1a imparts no odor to the formulation.

EXAMPLE 8

The monomers of formula I described herein serve exceptionally as reactive diluents for alkyds. In a typical formulation, the binder is a long oil alkyd (55% dehydrated castor oil, 32% o-phthalic anhydride, 17% glycerine - 50% solids in mineral thinner) diluted with an equal weight (based on alkyd solids) of a monomer of one of the first 5 examples. The formulations are pigmented with rutile titanium dioxide to a pigment/binder ratio of 40/60 parts by weight. Solids content is 77 percent by weight. The formulation without monomer also has a pigment/binder ratio of 40/60 parts by weight, and has a solids content of 56 percent after viscosity reduction with 20 parts of toluene. Cobalt naphthenate drier (0.2% metal based on alkyd solids plus monomer) is added and films are cast on panels and aged one week at ambient temperatures and then tested. Table B compares modified and unmodified alkyd.

TABLE B

| Ester-Ether Monomer Added | Visc.[a] (cp) | Hardness KHN | Pencil | Mandrel Flexibility | Tide[b] Bath 165° F 100 Hr. |
|---|---|---|---|---|---|
| None | 677 | 2.2 | B | ¼" | (c) 0 |
| Ex. 1 | 241 | 5.3 | F | 1¼" | 5 |
| Ex. 2 | 240 | 5.3 | F | ¼" | 5 |
| Ex. 3 | 375 | 4.5 | B | 1" | 6 |
| Ex. 4 | 289 | 3.8 | F | 1" | 6 |
| Ex. 5 | 271 | 5.4 | HB | 2_D | 9 |

[a]Brookfield Viscosity
[b]Registered Trademark, Monsanto
[c]Ratings on a scale of 0–10, 10 being unaffected, and 0 being a complete failure.

The data show that the use of the novel reactive monomers of this invention decrease the viscosity of the alkyd by a factor of 2 while simultaneously increasing the volume solids of the formulation by a factor of 2. In addition, there is a marked improvement in film hardness and resistance to hot alkali (Tide). Lastly, these monomers impart no odor to the coating.

EXAMPLE 9

The acrylate esters of Example 2 and Example 4 are useful as reactive diluents for a UV-curable, acrylatefunctional oil oligomer (Actomer X-80[1]). The oligomer is diluted with the monomers to a composition of 60 monomer/40 oligomer. Benzophenone (2 wt. %) photoinitiator and triethanolamine diacrylate[2] (3 wt. %) photosynergist are added and films are cast. Cure is effected with four passes (30 ft/min) about 5 inches under a 200 watt/inch medium pressure mercury arc; Table C shows the properties of the cured films.

[1]Trademark, Union Carbide
[2]U.S. Patent Application No. 639,332, Dec. 10, 1975, in the hands of a common assignee. See U.S. Pat. No. 4,001,304, Jan. 4, 1977.

TABLE C

| Monomer Diluent | Percent Weight Loss During Cure | Knoop Hardness Number | Impact (in-lb) Direct | Reverse |
|---|---|---|---|---|
| Ex. 2 | 0.12 | 2.1 | 45 | 45 |
| Ex. 4 | 0.15 | 5.9 | 45 | 20 |

The data in Table C show that the monomers of Example 2 and of Example 4 are UV-curable, little monomer is lost during cure, and the films are modestly hard and flexible.

EXAMPLE 10

The procedure of part (a) of Example 1 is repeated using 5 moles of hexamethylene ($C_6H_{12}$) glycol monodicyclopentenyl ether instead of the ethylene glycol monodicyclopentenyl ether.

EXAMPLE 11

Methacrylate Ester of 1,6-Hexanediol Mono-dicyclopentenyl Ether 1,6-Hexanediol mono-dicyclopentenyl ether is prepared in the same manner as the ethylene glycol analog, in Example 1 (b). This intermediate is purified by distillation (b.p. 147°–156° C/0.6 mm) in 63.5% yield. The corresponding methacrylate ester is prepared by esterification in the usual manner. The infrared spectrum of the methacrylate product is essentially identical to that of 1a (the monomer of Example 1 (a)).

EXAMPLE 12

Methacrylate Ester of Diethylene Glycol Mono-dicyclopentenyl Ether

In a manner similar to Example 11, the monodicyclopentenyl ether of diethylene glycol is isolated and purified by distillation (b.p. 122°–123° C/0.15 mm) in 62% yield and converted to the corresponding methacrylate ester. The infrared spectrum is essentially similar to that of 1a while the nmr spectrum differed only by the added absorption of 3.6 ppm (singlet, $CH_2O$-R).

EXAMPLE 13

Fumaric Acid bis(ethylene glycol mono-dicyclopentenyl) Ester

A 1-liter, four-necked, round-bottomed flask fitted with a mechanical stirrer, a reflux condenser atop a Dean-Stark trap, a thermometer and a heating mantle, is charged with 58.6 g. (0.5 mole) of fumaric acid, 194 g. (1 mole) of ethylene glycol mono-dicyclopentenyl ether (Example 1 (b)), 150 g. of toluene, and 5.75 g. (0.03 mole) of p-toluenesulfonic acid monohydrate. The mixture is heated at reflux; after 4 hr. water evolution ceases and 18 g. (1 mole) of water has been collected. Toluene is stripped in vacuo and the crude product is taken up in diethyl ether. The ether solution is washed with aqueous sodium carbonate solution to quench the acid catalyst and remove any residual carboxylic acid. The ether solution is washed repeatedly with water until the wash solutions becomes neutral, dried, and then stripped in vacuo.

EXAMPLE 14

Maleic Acid bis(ethylene glycol mono-dicyclopentenyl) Ester

The maleate bis-ester of ethylene glycol monodicyclopentenyl ether is prepared in the same manner as the fumarate ester described in Example 13. The nmr spectrum of the maleate differed only in the position of the maleate protons which are shifted upfield to 6.25 ppm. The infrared spectrum shows no substantial difference from that of the fumarate.

EXAMPLE 15

Copolymer of 75 LMA/25 Monomer of Example 1 (a)

A 500 ml., three-necked, round-bottomed flask equipped with a mechanical stirrer, a reflux condenser, a nitrogen inlet, a thermometer and a heating mantle is charged with 15 g. of monomr 1a, 45 g. of lauryl methacrylate (LMA), 120 g. of xylene and 0.6 g. of benzoyl peroxide initiator. The system is heated to 80° C under a nitrogen atmosphere and held at that temperature for 5.75 hr. The clear, colorless solution polymer has a viscosity of 70 centipoises and a measured solids (150° C/1 hr) of 32.1%.

EXAMPLE 16

Copolymer of Isobutyl Methacrylate/1a//75/25

A 1-liter, four-necked, round-bottomed flask fitted with a mechanical stirrer, a nitrogen inlet, an addition funnel, a thermometer, and a heating mantle, is charged with 70 g. of VM&P naphtha and heated to 115° C. A solution of 174.4 g. of isobutyl methacrylate, 58.1 g. of monomer 1a, 3.7 g. of a 50% solution of t-butyl peroctoate in odorless mineral spirits and 18.2 g. of VM&P naphtha is prepared. A portion (15%, 38.2 g.) of this solution is charged to the flask and the temperature is maintained at 115° C for 10 minutes. The remainder of this solution is then gradually added over 2 hours while maintaining 115° C in the flask. After completion of this addition, 1.4 g. of 50% t-butyl peroctoate solution in 24.4 g. of VM&P naphtha is added over 30 minutes and the polymerization is held at temperature for an additional 15 minutes. The viscous (4350-centipoise) polymer solution has a measured (150° C/1 hr.) solids of 45.8%.

EXAMPLE 17

Homo-oligomer of 1a

A 500 ml., three-necked, round-bottomed flask fitted with a mechanical stirrer, a drying tube atop a condenser, a nitrogen inlet, a thermometer, and a heating mantle is charged with 58.3 g. of toluene, 0.88 g. (7.87 mmol) of solid potassium t-butoxide, 5.8 g. (30 mmol) of the ether product of Example 1 (b), and 52.5 g. (200 mmol) of methacrylate ester product of Example 1 (a). The reaction mixture is heated to and maintained at 90°-95° C (4 hr.) until more than 95% of the monomer is consumed (glc analysis). The solution is then cooled and the catalyst is neutralized with 0.393 g. (7.86 meq) of 98% sulfuric acid. The amber solution is then filtered of suspended salts through a Celite Pad to yield a slightly viscous product (280 centipoises).

EXAMPLES 18 to 20

Evaluation of Coating Compositions

The copolymer and homo-oligomer resins of Examples 15-17 are evaluated for coatings properties under several conditions of formulation, viz.

Condition A — unmodified, resin as prepared

Condition B — 0.06% Cobalt II added as the naphthenate (on resin solids)

Condition C — 20 parts of monomer (1a) added as a curable reactive diluent to 80 parts of resin solids, plus 0.06% Cobalt as the naphthenate based on the total of (1a) plus resin solids Condition D — as in C but using 40 parts of (1a) to 60 parts resin solids Condition E — As in C but using 25 parts of 1,3-butylene glycol dimethacrylate to 75 parts of resin solids.

The compositions are cast on steel test panels to yield films of approximately 1.5 mil thickness when dry. One set of panels is allowed to cure for one week at ambient temperature; a second set is given an accelerated cure at 180° F for about 12 hours after drying for one week at ambient. Evaluation of coating properties yields the results of Table D.

Without drier metal, the resins undergo essentially no cure at ambient but do develop crosslinked properties at the higher temperature. With drier, cross-linked coating properties are developed at ambient temperature, with both the neat resins and their modifications with the polymerizable diluent monomers.

TABLE D

| | | | % Soluble[1] | | Hardness Tukon (KHN) | | Pencil | | Print Resis.[2] | | Impact[3] (in.-lb.) | |
|---|---|---|---|---|---|---|---|---|---|---|---|---|
| Ex. | Resin | Cond. | 1 Wk. | +180° F | 1 Wk. | +180° F | 1 Wk. | +180° F | 1 Wk. | +180° F | 1 Wk. | +180° F |
| 18 | Ex. 15 | A | 100 | 21.6 | Tack | Tack | <6B | <6B | >10 | 9 | 21 2/ 4 | 4/40 |
| | | B | 13.1 | 6.9 | 0.5 | 1.6 | <6B | 5B | 7 | 6 | <2/<2 | 6/30 |
| | | C | 17.8 | 9.9 | 0.5 | 1.6 | <6B | 3B | 10 | 6 | <2/<2 | 6/30 |
| | | D | 23.6 | 11.3 | 0.4 | 2.0 | <6B | 2B | 10 | 6 | <2/<2 | 6/20 |
| | | E | 14.5 | 8.9 | 0.7 | 1.3 | <6B | 5B | 7 | 5 | <2/<2 | 6/45 |
| 19 | Ex. 16 | A | 100 | 42.6 | 2.8 | 10.1 | 3B | HB | 10 | 2 | 6/<2 | 4/<2 |
| | | B | 20.5 | 13.0 | 6.9 | 12.5 | HB | F | 8 | 1 | 4/<2 | 4/<2 |
| | | C | 21.7 | 11.4 | 16.2 | 14.5 | F | 2H | 5 | 1 | <2/<2 | 4/<2 |
| | | D | 25.0 | 11.8 | 16.0 | 15.0 | F | 3H | 6 | 1 | <2/<2 | 8/<2 |
| | | E | 15.9 | 33.3 | 11.6 | 11.9 | 2H | 2H | 6 | 5 | 8/<2 | 4/<2 |
| 20 | Ex. 17 | A | 98.2 | 84.4 | Tack | 7.6 | <6B | B | >10 | >10 | <2/<2 | <2/<2 |
| | | B | 92.1 | 85.6 | Skin | Skin | <6B | <6B | >10 | >10 | <2/<10 | <2/<2 |
| | | C | 93.4 | 80.0 | Skin | Skin | <6B | 2B | >10 | >10 | 4/14 | <2/<2 |
| | | D | — | 38.1 | 2.9 | 13.7 | B | B | >10 | 9 | 4/20 | <2/<2 |
| | | E | 56.0 | 40.7 | 2.6 | 11.2 | HB | F | 9 | 2 | 6/24 | 8/<2 |

[1]Extraction with toluene
[2]Imprinting with cheesecloth, 120° F. for 1 hr. at 2 psi; ratings correspond to 0 = no print, 5 = light print, 10 = moderate to heavy print, etc.
[3]Gardner, direct/reverse

We claim:

1. A compound having the general formula:

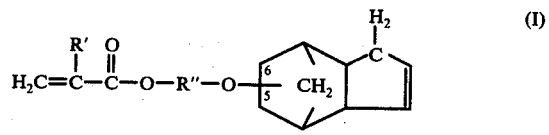

wherein R' is CH₃ and R" is selected from the group consisting of:
(a) Alkylene groups having 2 to 6 carbon atoms and
(b) Alkylene heteroalkylene groups wherein the total number of carbon atoms is from 4 to 6 and the heteroatom is O or S.

2. A compound according to claim 1 wherein R" is ethylene.

3. A compound according to claim 1 wherein R" is ethylene and R' is CH₃.

4. A compound according to claim 1 wherein R" is 2,2-dimethylpropylene.

5. A compound according to claim 1 wherein R" is a methyl-substituted ethylene.

6. A compound according to claim 1 wherein R" is 1-methylpropylene.

7. A compound according to claim 1 wherein R" is hexylene.

* * * * *

UNITED STATES PATENT OFFICE
CERTIFICATE OF CORRECTION

PATENT NO. : 4,097,677

DATED : June 27, 1978

INVENTOR(S) : William D. Emmons and Kayson Nyi

It is certified that error appears in the above—identified patent and that said Letters Patent are hereby corrected as shown below:

Cancel claim 3 in column 32, lines 51 to 52.

On the title page under the abstract, "7 Claims" should read -- 6 Claims --.

Signed and Sealed this

Twenty-fourth Day of April 1979

[SEAL]

Attest:

RUTH C. MASON
Attesting Officer

DONALD W. BANNER
Commissioner of Patents and Trademarks